United States Patent [19]

Van Devanter et al.

[11] Patent Number: 4,557,019
[45] Date of Patent: Dec. 10, 1985

[54] AUTOMATIC PORTION-CUTTING METHOD AND MACHINE

[75] Inventors: Douglas E. Van Devanter; Kelly R. Moore; James S. Tomlin, all of King County, Wash.

[73] Assignee: Seafreeze Limited Partnership, Seattle, Wash.

[21] Appl. No.: 640,006

[22] Filed: Aug. 10, 1984

[51] Int. Cl.⁴ .......................... A22C 25/18; B26D 5/34
[52] U.S. Cl. ........................................... 17/52; 17/54; 83/365; 83/367
[58] Field of Search ............... 17/1 R, 52, 54; 83/77, 83/365, 367, 370, 371, 471.3, 486.1, 488

[56] References Cited

U.S. PATENT DOCUMENTS 2,768,666 10/1956 Garapolo et al. .................. 83/367
3,762,257 10/1973 Mathews, Jr. .................. 83/367 X
4,136,504 1/1979 Wyslotsky .......................... 83/77

*Primary Examiner*—Robert L. Spruill
*Assistant Examiner*—Richard M. Mudd
*Attorney, Agent, or Firm*—Seed and Berry

[57] ABSTRACT

An automatic portion-cutting machine measures the shape of a fish fillet, calculates its corresponding volume and weight, and cuts the fillet to create portions of a predetermined size. In the preferred embodiment disclosed herein, fish fillets are advanced along a conveyor to allow these operations to take place. An optical monitoring station along the conveyor sends data relating to the shape of the fillet to a processing unit which calculates the weight of the fillet and actuates a cutting unit to cut the fillet at locations corresponding to the portion size desired.

6 Claims, 9 Drawing Figures

AUTOMATIC PORTION-CUTTING METHOD AND MACHINE

DESCRIPTION

1. Technical Field

This invention relates to fish-processing equipment, and more particularly, to an apparatus for automatically cutting fish fillets into portions of preselected size.

2. Background Art

Retailers of raw or prepared fish often desire to sell fish in equally sized portions. A restaurant, for example, may prefer to serve its patrons 6L -ounce or 8-ounce portions of fish and will pay more for fish portions which are within a given tolerance of the desired weight.

When whole fish are commercially processed, each fish is typically sent to a filleting machine which cuts fish into two elongated portions or "fillets." The fillets can then be cut into smaller portions as desired. Such cutting will generally produce a number of portions of the desired size as well as "waste" portions which are too small and must be used for another purpose.

Prior to the present invention, evenly sized fillet portions were commonly obtained by estimating the portion of a fish fillet necessary to provide the desired weight and manually cutting the fillet to sever the portion. The severed portions were then weighed to determine if they were within the tolerance desired for a particular use.

This manual estimating and cutting method has several drawbacks. Specifically, it is relatively slow and labor-intensive. Additionally, it is relatively inaccurate. The present invention was developed to eliminate these drawbacks.

DISCLOSURE OF INVENTION

It is an object of this invention to provide an apparatus which will automatically and accurately cut fish fillets into portions of a preselected size.

This and other objects which will become apparent as the invention is more fully described below are obtained by providing an automatic portion-cutting machine which measures the shape of a fish fillet, calculates its corresponding volume and weight, and cuts the fillet to create portions of a predetermined size. In the preferred embodiment disclosed herein, fish fillets are advanced along a conveyor to allow these operations to take place. An optical monitoring station along the conveyor sends data relating to the shape of the fillet to a processing unit which calculates the weight of the fillet and actuates a cutting unit to cut the fillet at locations corresponding to the portion size desired.

Optical monitoring is preferably accomplished by projecting an array of inclined light beams longitudinally onto the conveyor. A single camera may then be used to monitor the location of the array and collect data on the size and shape of each fillet as it passes through the monitoring station.

In the preferred embodiment illustrated herein, the cutting unit cuts diagonally with respect to the conveyor to produce a straight cut across the fish. The depth of the cut made by the cutting unit may be set, depending upon the type of conveyor used and whether or not it is desired to completely sever the portions with the cutting unit.

BEST MODE FOR CARRYING OUT THE INVENTION

Figure 1:
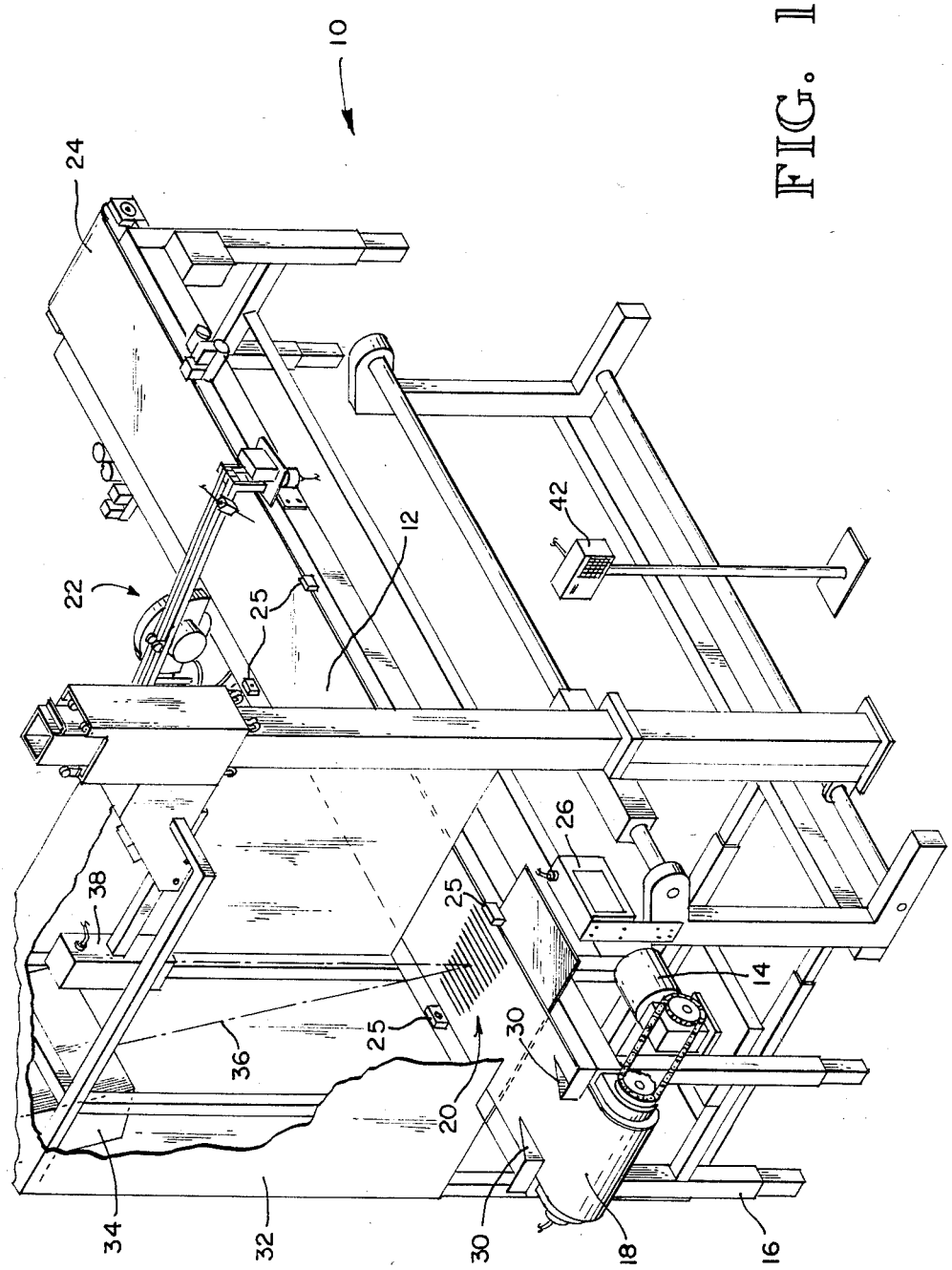
FIG. 1 is an isometric view of a preferred embodiment of the invention.

An automatic portion-cutting machine 10 comprising a preferred embodiment of the present invention is disclosed in FIGS. 1–4. An elongated conveyor 12 runs the length of the machine and is powered by a motor 14 mounted on the machine frame 16.

During operation, fish fillets are placed on the front end 18 of the conveyor and transported through a monitoring station 20 and past a cutting unit 22 to the back end 24 of the conveyor for further processing and/or packaging.

As the fillet passes through the monitoring station, a processing unit receives data from the monitoring station, calculates the corresponding volume and weight of the fillet, and determines the timing of the necessary cuts to divide the fillet into desired portions. When the fillet has moved along the conveyor to a location adjacent the cutting unit, the cutting unit will cut the fillet in response to commands from the processing unit.

The machine preferably includes vertical conveyor restraints 25 positioned on either side of the conveyor adjacent the monitoring station and cutting station to prevent undue vertical displacement of the conveyor during the measuring and cutting operations of the machine.

MONITORING STATION AND PROCESSING UNIT

When a fish fillet is placed on the front end 18 of the conveyor 12, it passes between a pair of guides 30 which direct the fillet toward the central portion of the conveyor. Once the fillet passes through the guides, it enters the monitoring station. In the preferred embodiment illustrated herein, the monitoring station is surrounded by a shroud 32 which blocks ambient light from entering the monitoring station and interfering with the operation of the optical equipment. The shroud may be fabricated of any suitable light-blocking material. For many environments, light detection (as described below) may be satisfactory without use of the shroud or any blocking mechanism; and hence the shroud may be omitted for many applications.

As fish fillets pass through the monitoring station, a series of transverse height contours are measured. A beam generator 34 positioned above the conveyor projects a plurality of light beams 36 toward the conveyor. A camera 38 positioned above the conveyor monitors the location of the beams with and without fillets on the conveyor and transmits that information to the processing unit.

Figure 2:
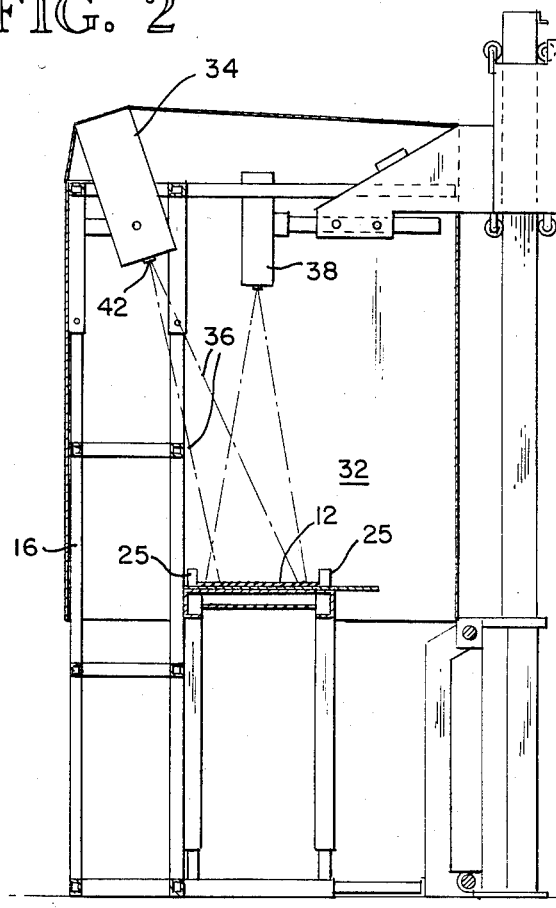
FIG. 2 is a side elevation view of the embodiment of FIG. 1.

In the preferred embodiment illustrated herein and as best seen in FIG. 2, the beam generator is rearwardly offset from the conveyor such that it projects the light beams 36 toward the conveyor at angles inclined with respect to the vertical. The camera is positioned directly above the conveyor such that is is aligned vertically over the conveyor and looks vertically at the conveyor at the center of its field of view. The particular arrangement illustrated herein was selected because it works well with the size and shape of the upper portion of the machine frame 16 and the particular camera and beam generator mounted thereon. The position illustrated is not critical to the operation of the invention. In fact, the beam generator and camera can be mounted in almost any position and orientation above the conveyor, provided that each is directed toward the conveyor at a different angle from the other. The position of the camera and beam generator could be reversed, for example, or the camera and beam generator could be placed on opposite sides of the conveyor such that each was inclined with respect to the vertical.

The beam generator and camera combine to produce data which can be used to calculate an estimate of the incremental volume and corresponding weight of each fillet. When there is no fillet on the conveyor, the light beams will contact the conveyor, forming a series of illuminated lines 40, as illustrated in FIG. 1. The camera will detect the initial location of the beams on the conveyor and transmit this information to the processing unit.

Figure 3:
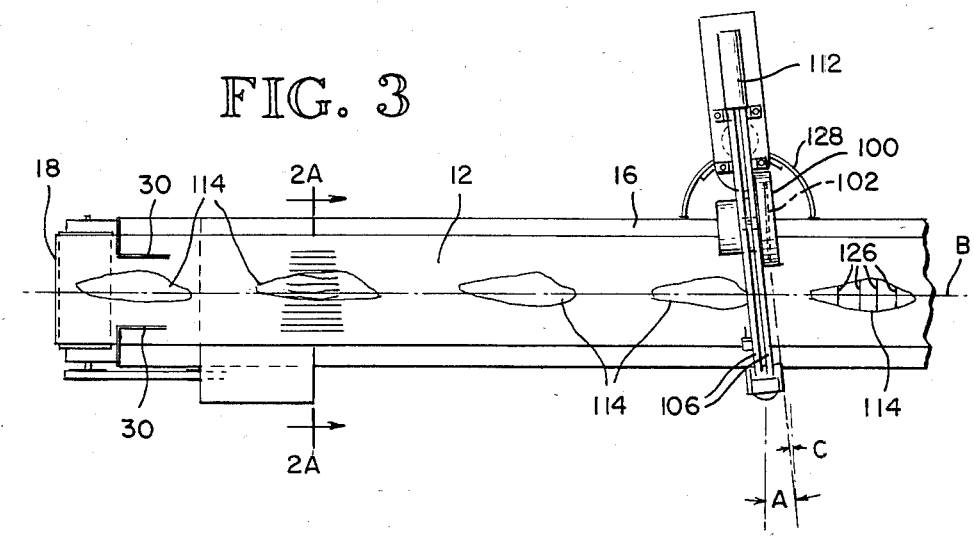
FIG. 3 is a plan view of the conveyor and cutting unit of FIG. 1 illustrating several fillets advancing along the conveyor.

The camera employed in the preferred embodiment is a digital camera which scans a transverse line, designated A—A in FIG. 3, to determine the amount of light present at a plurality of points along line A—A. The camera has 256 light-sensitive pixels which can take individual readings across line A—A and assign a numerical value corresponding to the brightness of light, or "gray level," detected. These gray level values are fed into the processing unit, which will scan the values for peaks which correspond to the transverse location of the light beams along line A—A.

Figure 2A:
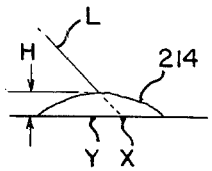
FIG. 2A is a schematic diagram illustrating the position of a light beam projected toward the conveyor.

When an object on the conveyor passes under the light beams across line A—A, the beams will terminate on the object rather than the conveyor and the resulting increased height of the beam will cause the light beam to shift transversely along line A—A. The peaks detected by the digital camera will also shift and be detected by different pixels. Because the light beams are inclined with respect to the camera angle, the change in height represented by the transverse shift can be calculated using geometry. As illustrated in FIG. 2A, a beam L, which was originally detected at point X along line A—A (with no fillet present), will be detected at point Y along line A—A when a fillet 214 is present. By knowing the inclination of the beam L, it is possible to calculate the height H of the fillet which corresponds to the transverse deflection from point X to point Y.

In the preferred embodiment, the height is determined using the linear approximation to estimate the geometric relationship discussed above and illustrated in FIG. 2A. Each beam is assigned a scale factor which is used to approximate the fillet height corresponding to a measured amount of transverse deflection for that beam. Because the beams are effectively generated from a point source 42 and dispersed across a substantially horizontal conveyor, the beams will be inclined at various angles, as can best be seen with respect to the two outermost beams 36a, 36b which are illustrated in FIG. 2. Similarly, the camera detection angles will increase with respect to the vertical at the outer ends of the conveyor. It is thus preferred that a scale factor be assigned to each individual beam.

Beam scale factors are calibrated by passing an object having a constant and known height through the monitoring station. The transverse deflection of each beam corresponding to the object height is stored in the processing unit and used as a basis for linear approximations of the fillet height for a given transverse deflection. For example, if the light intensity peak for a given beam is detected at the 100th pixel for a vacant conveyor and the 90th pixel for a calibrating object with a height of 20 millimeters, the height represented by each pixel shifted would be 2 millimeters. Thus, after calibration, if the light intensity peak for the same beam is detected by the 96th pixel when a fillet is passing under the camera, the height of the fillet for that beam will be approximated to be 8 millimeters.

In the preferred embodiment, thirteen light beams 8 inches in length are projected toward the conveyor. By approximating the height of the fillet at each beam location, a height contour is generated. Such height contours are generated periodically in response to encoder pulses generated at intervals corresponding to a set amount of conveyor movement. In the preferred embodiment illustrated herein, for example, the generation of encoder pulses is linked to the conveyor motor such that a pulse is generated for every 1/10 inch of conveyor movement.

Once a height contour is generated by the processing unit, the area under the height contour is estimated using Simpson's Rule. For the purpose of this Simpson's Rule approximation, the height values of the height contours are assumed to be at the equivalent beam spacings detected for a vacant conveyor.

The area approximation is multiplied by the encoder pulse length (1/10 inch in the preferred embodiment) to produce an incremental volume, referred to herein as a "slice" volume. The slice volume is then multiplied by the fish density to yield an estimate of the weight of a one-encoder-pulse-length slice of the fillet.

As each fillet passes through the monitoring station, the weight of adjoining slices is tabulated until the total tabulated weight is equal to the preselected portion size. When the tabulation indicates that an entire portion has been measured, the processing unit takes the corresponding encoder pulse and adds to it the number of encoder pulses necessary for the last measured slice to pass by the cutting unit. This encoder pulse value is then used to cue the cutting unit to cut the fillet at a location corresponding to that slice to create the desired portion.

DENSITY CALCULATION

The density value for a given type of fish is preferably determined experimentally by the automatic portion-cutting machine. In the preferred embodiment, the processing unit may be set into a special mode to calculate the density. A fish fillet is first accurately weighed by the machine operator who then enters the weight measurement into the processing unit. The fillet is then sent through the monitoring station with the processing unit set in density calculation mode. In this mode, the processing unit will tabulate the slice volumes for the entire fillet and divide the total volume by the actual weight to determine the density value. The density value may then be used to measure portions, as described above. In a preferred embodiment, a measured fillet may be run through the monitoring station a plurality of times to calculate the density as many times as desired. Each subsequent calculation can be recorded by the machine operator and averaged after discarding any obviously bad data. The average value can then be entered into the processing unit by the operator, thereby increasing the accuracy of the density calculation.

EQUIPMENT

Figure 6:
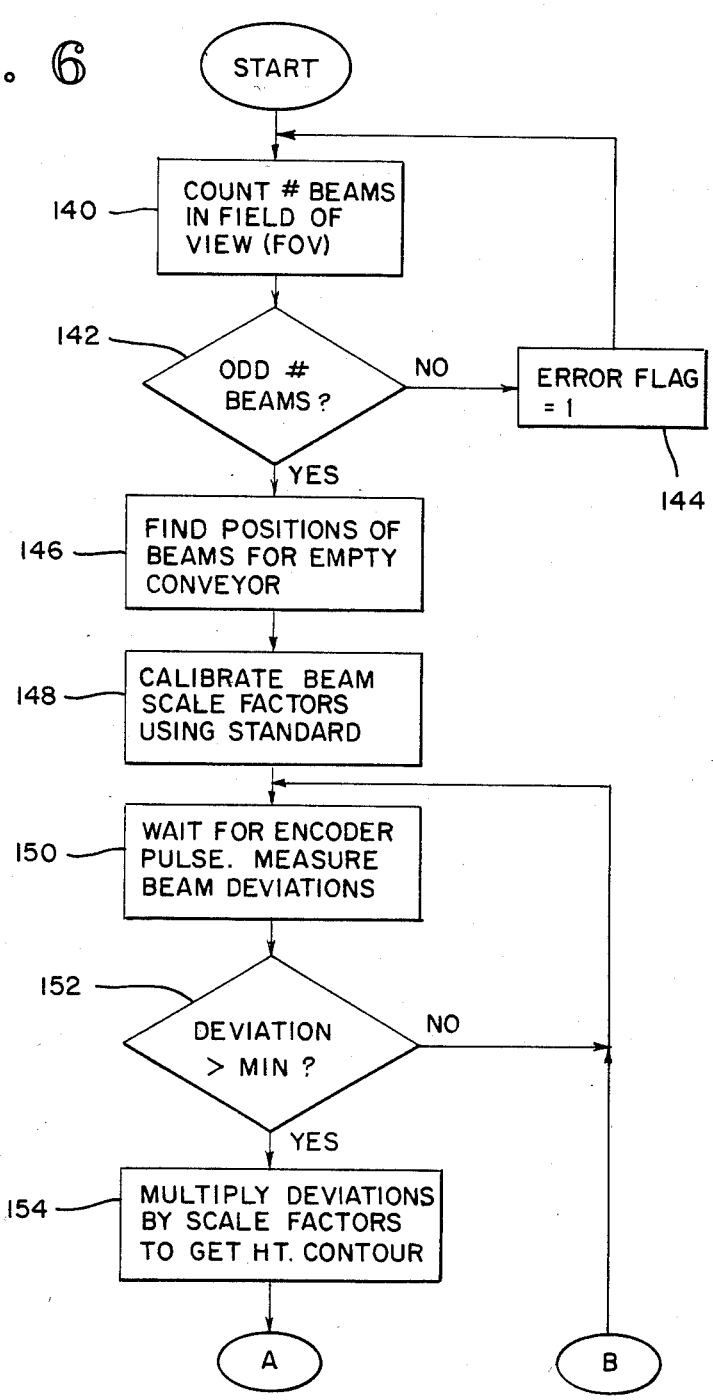
FIG. 6 is the first portion of a flow chart illustrating the fillet portion measuring task performed by the processing unit.
Figure 7:
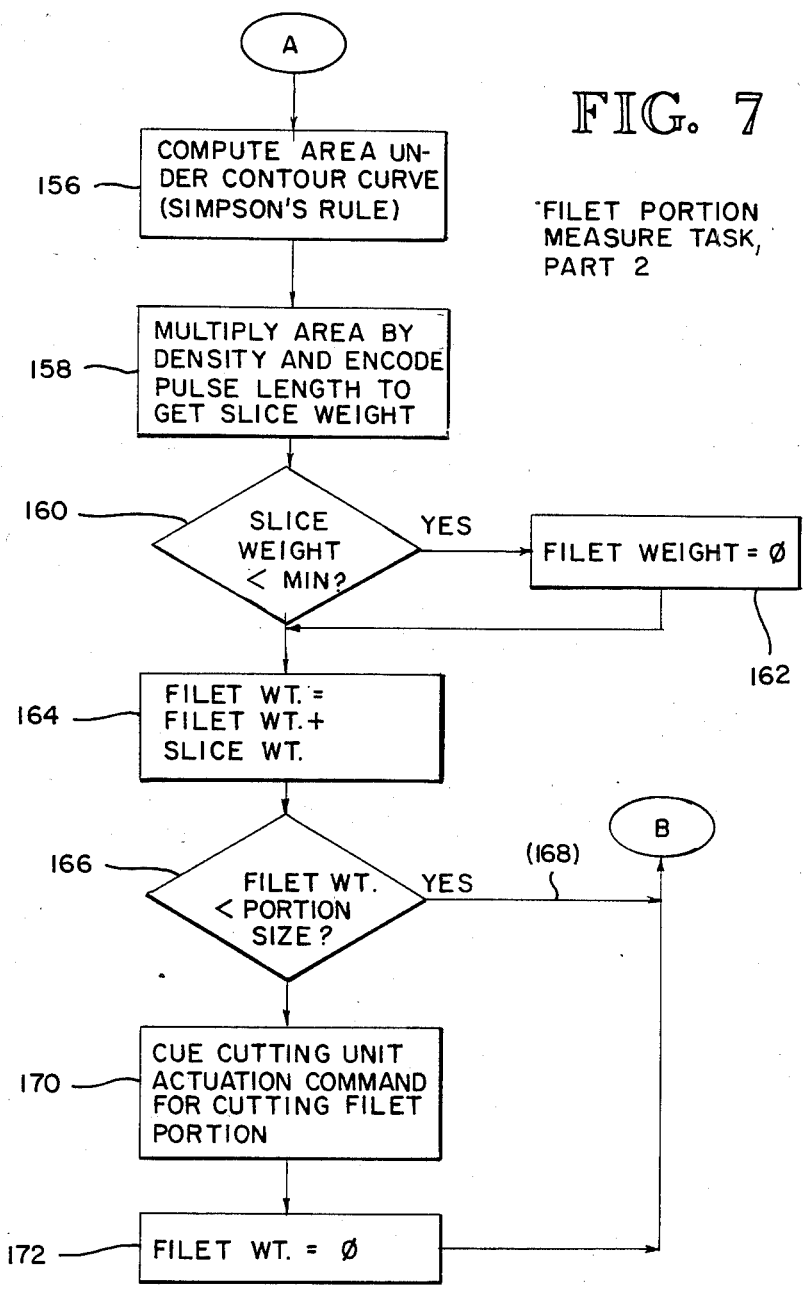
FIG. 7 is the second part of the flow chart illustrated in FIG. 6.
Figure 8:
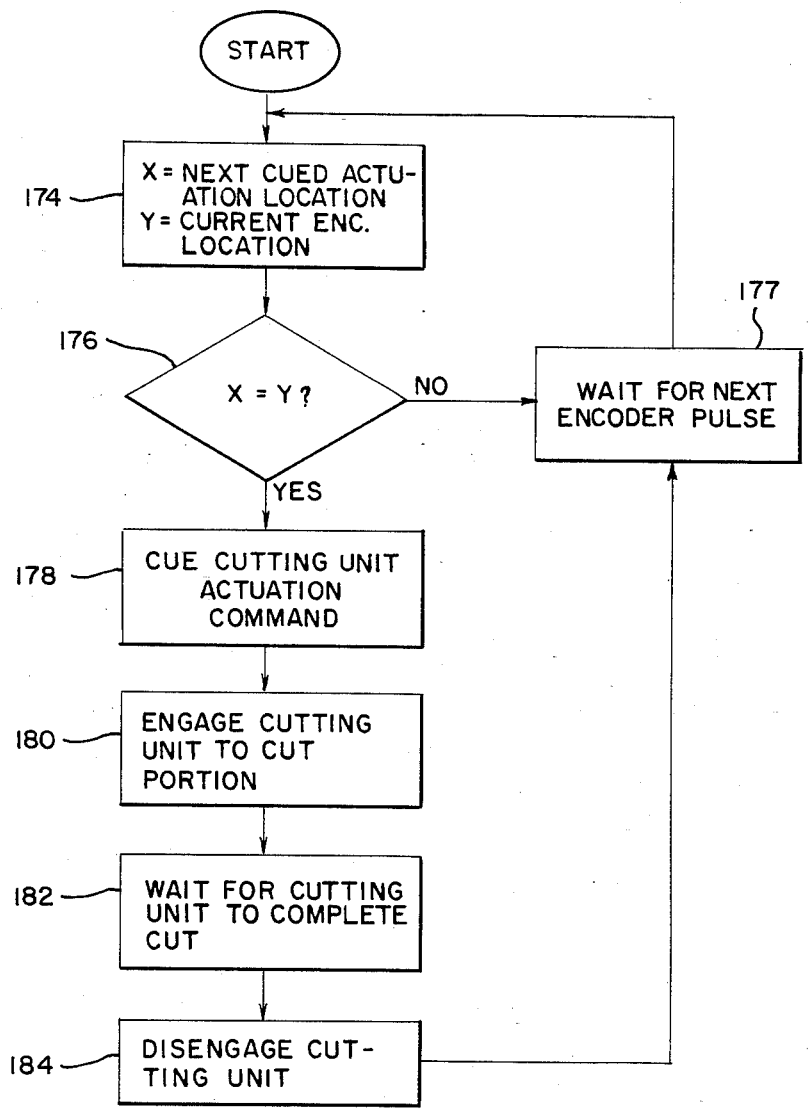
FIG. 8 is a flow chart illustrating the cutting unit queueing task performed by the processing unit.

The processing unit and camera used in the preferred embodiment illustrated herein are sold by Opcon Company of Everett, Washington as the Opcon IS-10 system. In the preferred embodiment, the system is programmed in FORTH to perform the estimating and calculating functions described herein. FIGS. 6–8 are flow charts indicating the logic used in the preferred embodiment.

PROGRAM FLOW CHARTS

FIGS. 6 and 7 illustrate the logic used in the fillet portion measurement task. The number of beams detected in the camera's field of view (FOV) is first counted (140). A check is then made to see if all beams are being detected by determining whether an odd or even number of beams have been detected (142). In the preferred embodiment, thirteen beams are employed. Consequently, if an even number of beams are detected, there is some error with the system, and an "error flag" (144) is preferably sent to the display panel 42. If an odd number of beams are detected, the program continues by finding the position of the beams when there is nothing on the conveyor (146). The beam scale factors may then be calibrated using an object having a standard height, as described in detail earlier (148).

Once the beam scale factors have been calibrated, the machine is ready to measure fillets. When an encoder pulse is received, the beam deviations in beam locations are measured (150). The total number of deviations is checked against the preset minimum (152) to determine whether the deviations are the result of a fillet actually being present on the conveyor or merely the result of "noise" caused by conveyor vibration or the like. It has been found that beam deviations for three beams or more will typically represent the presence of an actual fillet rather than noise.

If more beam deviations occur than the preset minimum, the beam deviations are multiplied by the scale factors to produce a height contour (154). As indicated in FIG. 7, the values of the height contour are used to calculate the area under the contour curve using Simpson's Rule (156). The area is then multiplied by the density and the encoder pulse length to determine the weight of the slice passing through the field of view (158). This slice value is then compared against another present minimum (160). If the slice weight is less than this minimum, it indicates that no fillet is present; and the total fillet weight value is reset to zero (162).

The fillet mass is continually tabulated and compared to the preset portion size (164). If the preset portion size is not reached (166), the program will return to calculate the value of the next slice using the same algorithm (168, 150). If the portion size is obtained, the program will first cue the cutting unit for actuation at the appropriate time (170) and weight (172), and then reset the fillet and start through the algorithm again.

FIG. 8 illustrates the operation of the cutting unit actuation task. As the cueing locations for the cutting unit are determined by the portioning task, they are stored in the processing unit as variable X (174). The cueing task logic compares this value to the current encoder location (176). If the next cued encoder pulse location has not been reached, the system will wait for the next encoder pulse (177) and rerun the comparison of the new encoder pulse value with the next cued value (174). This process will continus until the encoder value is equal to the next cued value. When this occurs, the cutting unit actuation will be de-cued (178) to actuate the cutting unit to cut the portion (180). When the cutting unit is actuated, a signal is sent to a pilot valve 116 to supply air pressure to activate the cutting unit as described in detail below. The logic is programmed with a built-in time delay to leave the cutting unit operating for a predetermined amount of time to enable the cutting blade to cross over the conveyor and back (182). After a preset number of encoder pulses have been detected, the cutting unit is disengaged (184) and the logic begins checking for the next cued actuation location.

The automatic portion-cutting machine includes a display and control panel 42, illustrated in FIG. 1. The panel allows the machine operator to input information into the processing unit, such as the desired portion size or the fillet weight when calculating the fish density. Additionally, the operator can check the value of certain counters within the processing unit which tabulate various values. In the preferred embodiment, for example, the total number of portions cut, the total weight of the portions cut, the total number of scrap or ¢waste" portions processed so far, and the total weight of such scrap portions are tabulated and stored in the processing unit and may be called onto the display screen 44 by the operator.

CUTTING UNIT

In the preferred embodiment illustrated herein, the cutting unit 22 is pneumatically operated. The cutting unit comprises a movable blade assembly 100 which includes a cutting blade 102 and a pneumatic motor 104. The blade assembly is rollably mounted on a pair of elevated crossbars 106 which extend above and transversely across the conveyor 12. The crossbars are mounted to the machine frame through means of a pair of elevating cylinders 108, 110 on either side of the conveyor. The elevating cylinders enable the elevation of the crossbars to be raised and lowered as the elevating cylinders are pressurized and de-pressurized, respectively.

The position of the blade assembly along the crossbars is controlled by the blade cylinder 112. When activated, the blade cylinder will propel the blade assembly across the conveyor to cut the fillet 114. The blade cylinder is actuated by the processing unit, which signals a pilot valve 116 to pressurize the blade cylinder for the length of time necessary for the blade assembly to travel across the conveyor. The pilot valve is deactivated to pressurize the back side of the blade cylinder and return the blade assembly to its original position.

Figure 4:
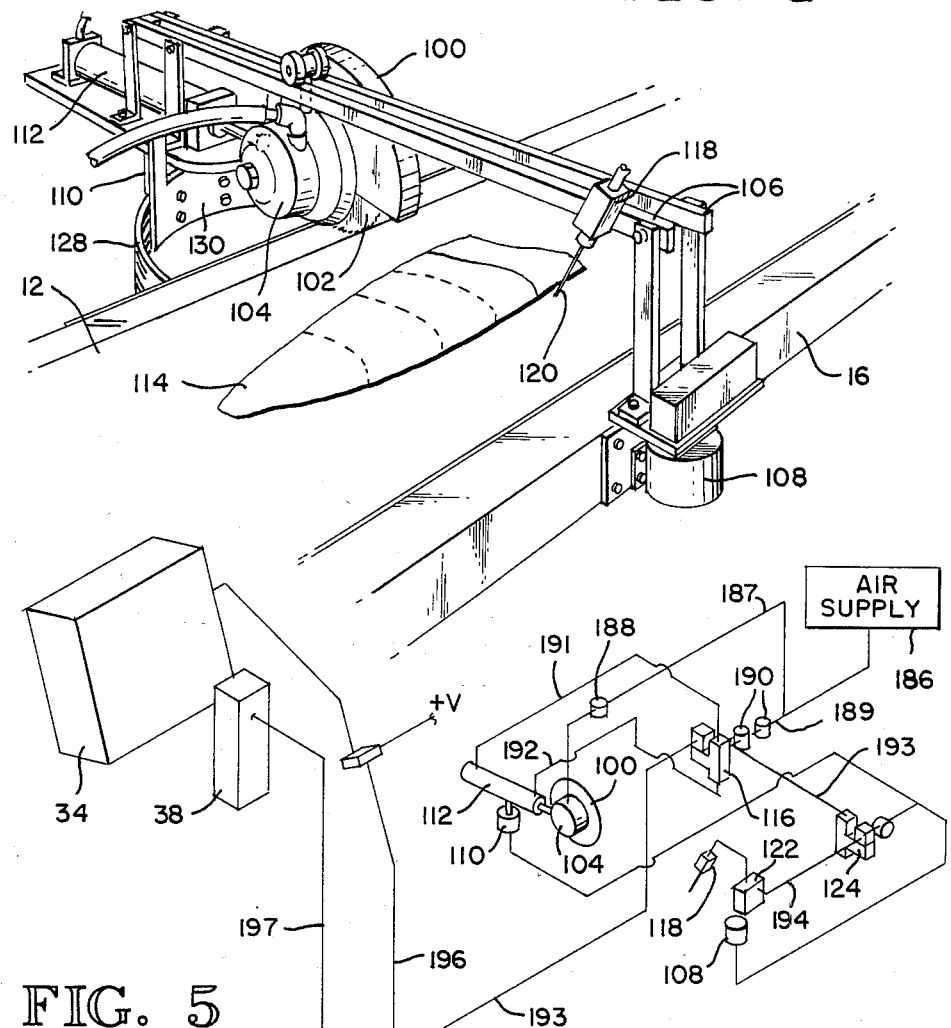
FIG. 4 is an isometric view illustrating the conveyor and cutting unit of the embodiment illustrated in FIG. 1.

When the blade assembly reverses its direction of travel and begins its return trip across the conveyor, the crossbars are elevated by the elevating cylinders to prevent the cutting blade from contacting the fillet and making unwanted cuts. A microswitch 118, with an extending detection rod 120, is mounted on a crossbar, as shown in FIG. 4, the detect when the blade assembly has completed its first pass across the conveyor. The microswitch communicates with the power supply box 122, which signals the pilot valve 124 to send pneumatic pressure to the elevating cylinders 108, 110 and raise the crossbar and blade assembly.

As best seen in FIG. 3, the crossbars 106 are inclined at an angle A with respect to the conveyor when looking in plan view. The inclination compensates for the travel of the fish fillets 114 when they are being cut, and enables the blade assembly to make cuts 126 in the fillet which are substantially perpendicular with respect to the longitudinal axis B of the conveyor.

To ensure that the blade will travel through the fish filets in a straight travel path, the blade assembly is mounted on the crossbars 106 at an angle C offset from the crossbars, as seen in Figure C. This offset enables the cutting blade 102 to make a clean pass through the fish fillets.

Because it may be desirable to vary the speed of the conveyor, and hence the amount of fillet travel which must be compensated for, it is preferred that the cutting unit be adjustable to various angles with respect to the conveyor. In the preferred embodiment illustrated herein, this is accomplished by means of an arcuate mounting member 128 which extends outwardly from the machine frame 16 adjacent the blade cylinder, as seen in FIGS. 3 and 4. The side of the cutting unit mounted on the arcuate mounting member can be adjusted by sliding a correspondingly shaped support plate 130 into the position desired.

Figure 5:
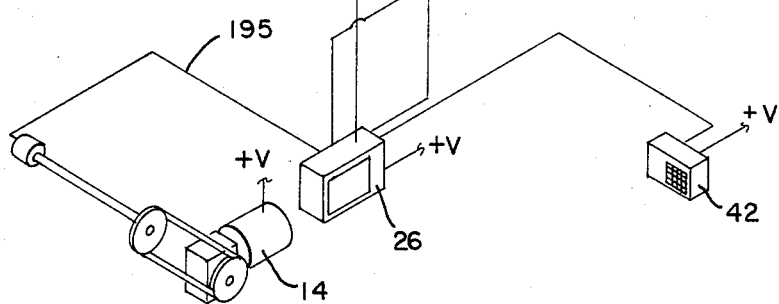
FIG. 5 is a schematic illustration of the pneumatic and electrical elements of the embodiment illustrated in FIG. 1.

A schematic diagram of the electronic and pneumatic components used in the preferred embodiment of the invention is illustrated in FIG. 5. The pneumatic elements communicate with a central air supply 182 to provide pressurized air as necessary. Air line 187 and regulator 188 preferably supply air from the air supply at about 20 psi to the blade motor 104. A branching line 189 passes through regulators 190 and into a pilot valve 116 which communicates with the blade cylinder 112 through a first pressure line 191 to activate the blade cylinder to propel the cutting blade assembly 100 across the conveyor. A second air line 192 communicates with the blade cylinder to allow pressurization of the back side of the cylinder to return the blade assembly to its original position. An electrical signal line 193 runs between the processing unit 26 and the pilot valve 116 to activate the pilot valve to send pressurized air through line 191 and line 192 as necessary for a complete back and forth cycle of the cutting blade assembly.

The height of the crossbars 106 (see FIG. 4) is controlled by elevating cylinders 108, 110. Actuation of the elevating cylinders is controlled by a pilot valve 124 which receives pressurized air from line 193, which communicates with line 189. Signal line 194 links the pilot valve 124 to the power supply box 122 to transmit input from the microswitch 118. The electronics components are interconnected in the manner shown in FIG. 5. The conveyor motor 14 is linked to the processing unit 26 by signal wire 195 to enable the encoder pulses to be generated in response to rotation of the motor and transmitted to the processing unit. The beam generator 34 and camera each communicate with the processing unit via respective signal lines 196, 197.

Although the invention has been described herein with respect to a particular embodiment, it is not intended that the invention be limited to this embodiment. Rather, it is intended that the invention encompass all equivalent embodiments.

We claim:

1. An apparatus for automatically cutting fish fillets to mark portions of a preselected weight, which comprises:
   an elongated conveyor for transporting fillets along the apparatus in a downstream direction;
   measuring equipment adjacent the conveyor at a first location for incrementally collecting data on the shape of slices of the fillets as they travel along the conveyor past the measuring equipment;
   a cutting unit adjacent the conveyor at a location spaced apart from and downstream with respect to the measuring equipment, the cutting unit movable across the conveyor to cut fillets travelling on the conveyor; and
   a processing unit communicating with the measuring equipment to receive data on the shape of the fillet slices, the processing unit using the data to calculate the volume and corresponding weight of the slices, tabulate the total of the slice weights and compare the total to a preselected portion weight, the processing unit actuating the cutting unit to cut the fillets at locations corresponding to portions substantially equal to the preselected portion size.

2. The apparatus of claim 1 wherein the cutting unit is set to cut through the entire fillet and substantially sever the cut portions from the remainder of the fillet.

3. The apparatus of claim 1 wherein the cutting unit travels across the conveyor on a path inclined with respect to the conveyor in the direction of conveyor movement to enable the cutting unit to make a cut through the fillet which is substantially perpendicular with respect to the longitudinal axis of the conveyor.

4. An apparatus for automatically cutting fish fillets to mark portions of a preselected weight, which comprises:
   an elongated conveyor for transporting fillets along the apparatus in a downstream direction;
   means for measuring the shape of fillets travelling on the conveyor at spaced apart locations along the conveyor;
   a cutting unit adjacent the conveyor at a location spaced apart from and downstream with respect to the measuring means, the cutting unit movable across the conveyor to cut fillets travelling on the conveyor; and
   a processing unit communicating with the measuring means to receive the fillet shape data generated thereby, the processing unit using the data to calculate the volume and corresponding weight of incremental weights and compare the total to a preselected portion weight, the processing unit actuating the cutting unit to cut the fillets at locations corresponding to portions substantially equal to the preselected portion size.

5. The apparatus of claim 4 wherein the measuring means comprises:
   a beam generator projecting an array at parallel, spaced apart light beams longitudinally into the conveyor;

a camera monitoring the conveyor at a location where the light beams intersect the conveyor, the camera and beam generator being aligned with respect to the conveyor at different angles such that the camera can monitor the location of the beams with and without a fillet on the conveyor and determine the approximate shape of a transverse cross-section of the fillet based on the change in location of the beams.

6. A method of automatically cutting fish fillets into portions of a predetermined weight which comprises the steps of:

placing the filet on an elongated conveyor;

projecting a plurality of parallel spaced apart light beams onto the conveyor;

monitoring the conveyor to record the location of the light beams on the conveyor when no fillet is present;

monitoring the location of the light beams at a preselected time increment as a fillet passes under the light beams;

comparing the location of the light beams with and without a fillet present to develop a series of height contours for the fillet;

computing the incremental weights of the fillet and comparing the cummulative totals to the predetermined portion weight; and actuating a cutting mechanism adjacent the conveyor to cut the fillet at locations corresponding to the preselected portion size.

* * * * *